United States Patent [19]
Portinari et al.

[11] 3,829,600
[45] Aug. 13, 1974

[54] JOINT FOR ELECTRIC CABLES HAVING CONDUCTOR INSULATED WITH AN EXTRUDED DIELECTRIC

[75] Inventors: Giovanni Portinari, Sesto San Giovanni; Adriano Zagarella, Milan, both of Italy

[73] Assignee: Industrie Pirelli Societe per Azioni, Milan, Italy

[22] Filed: Oct. 25, 1973

[21] Appl. No.: 409,763

[30] Foreign Application Priority Data
Nov. 16, 1972 Italy.................................. 31714/72

[52] U.S. Cl. ........................... 174/73 R, 174/88 R
[51] Int. Cl. ......................................... H02g 15/08
[58] Field of Search ............. 174/73 R, 73 SC, 88 R

[56] References Cited
UNITED STATES PATENTS
| | | | |
|---|---|---|---|
| 3,290,428 | 12/1966 | Yonkers | 174/73 R |
| 3,580,986 | 5/1971 | Misare | 174/73 R |
| 3,612,746 | 10/1971 | Sankey | 174/73 R |
| 3,673,311 | 6/1972 | Misare | 174/73 R |
| 3,718,749 | 2/1973 | Cunningham | 174/73 R |

*Primary Examiner*—Laramie E. Askin
*Attorney, Agent, or Firm*—Brooks Haidt & Haffner

[57] ABSTRACT

A joint for joining the ends of electric cables having insulation extruded over the conductor thereof and a screening layer around the insulation in which an elastomeric sleeve with a stress screen therein surrounds and engages the insulation and the screening layer at the opposite sides of the bared and connected conductor ends and such ends and is compressed axially to cause it to expand radially and press against the insulation thereby expelling air from between the sleeve and the insulation. At least the end portions of the stress screen are conductively connected to the screening layer. The sleeve includes a further stress screen on the internal wall thereof which surrounds the connected conductor ends and preferably is supported by a rigid contact element intermediate, and conductively interconnecting, said further screen and the conductor ends. Threaded rings and resilient ring seals seal the joint housing to the cable sheaths to prevent moisture from entering the joint.

12 Claims, 4 Drawing Figures

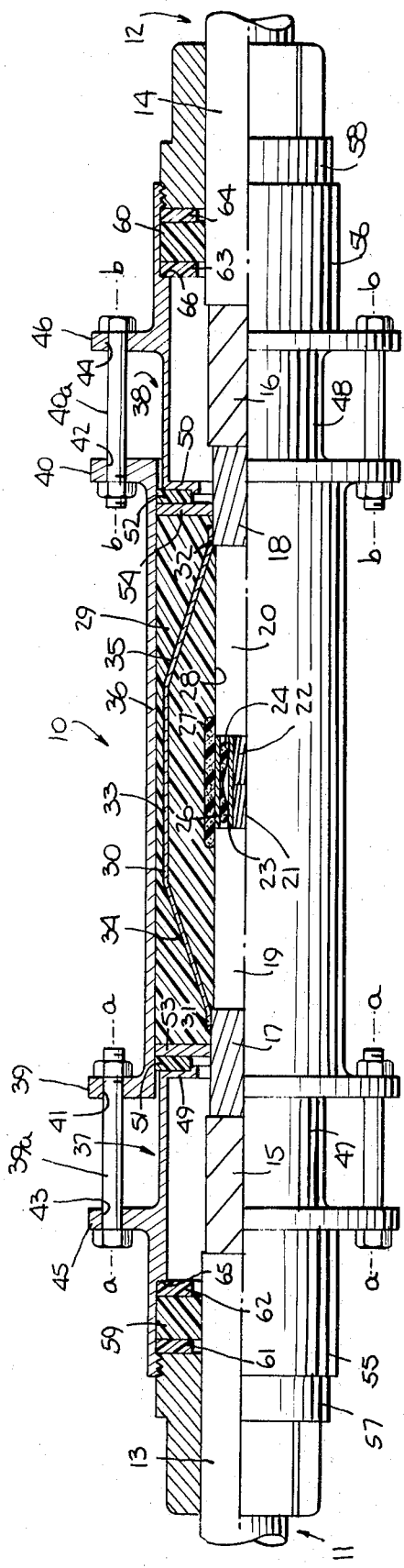
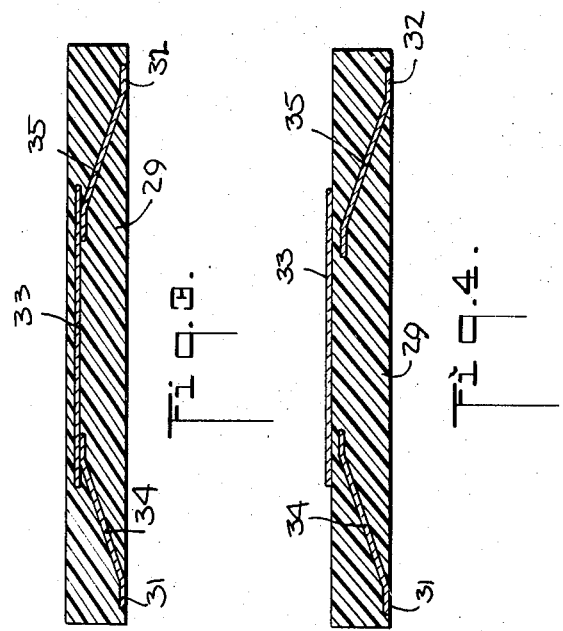
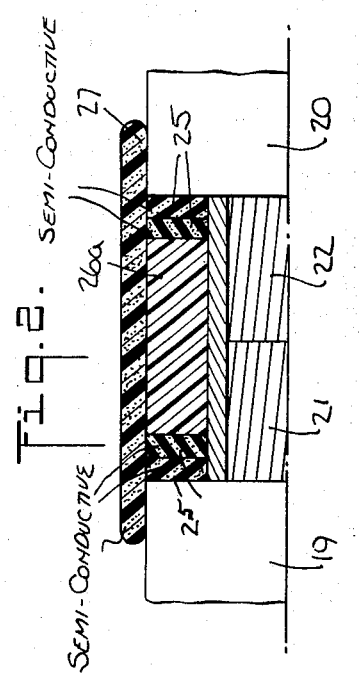

JOINT FOR ELECTRIC CABLES HAVING CONDUCTOR INSULATED WITH AN EXTRUDED DIELECTRIC

The present invention relates to an improvement in joints intended in particular for the connection of conductors of corresponding ends in single or multi-core electric cables for medium and high voltages, insulated with an extruded dielectric material, for example, saturated chain ethylene-propylene copolymer or ethylene-propylenediene terpolymer, polyethylene, polyvinylchloride, crosslinked polyethylene, etc.

One of the methods at present in use for constructing joints between conductors with extruded insulation consists in shaping the end of the insulation similar to a pencil point, and in rebuilding it, after the connection of the conductors, by means of a winding of crepe paper or of another dielectric material appropriately wound up in a cigar-wrapper-like fashion. As is known, said process is slow and requires highly specialized personnel and is, therefore, expensive. Further, despite the skill of the operators, there is always the possibility of formation of wrinkles in the wrapping in which air can be trapped, with the consequent effect of disruptive discharges when the cable is in use.

Another conventional method is that known in this field by the name "pennant" type lapping. In this case, the insulation in the jointing zone is restored with the aid of a previously shaped foil of rubber or plastic material, comprising a semi-conductive part and an insulating part. The foil is wound up with its semi-conductive part in contact with the conductor connection and with its insulating part towards the outside. However, in this case, also, there is the risk of stretching the foil too much or too little, during its application, with the possible formation of wrinkles or pockets in which air might be retained.

Another method provides the rebuilding of the joints by means of special tapes between which is subsequently injected a resin capable of solidifying by polymerization. In this case as well, the method is slow, specialized labor is necessary, and there is still the risk the air bubbles may be trapped in the wrinkles of the winding and may not be reached by the resin. Also, there is the danger that air bubbles will be entrapped in the resin.

Another method consists in applying half-shells made of polyethylene around the jointing zone. Said half-shells have the object of forming means for receiving a resin which solidifies by polymerization. The variations in the diameter of the cable insulation during the cable use, due, for example, to the thermal cycles, can easily cause the detachment of the insulation from the resin, with the consequent formation of zones in which air is present.

According to another method, the insulation is rebuilt by applying a pre-shaped sleeve of vulcanized rubber, having an inner diameter smaller than the diameter of the cable core. The sleeve is forced on the core, and it is, therefore, necessary, for each core having a certain nominal diameter, to have available a plurality of sleeves having a different diameter in order to take into accounts the processing tolerances. Moreover, this type of sleeve contains, embedded in it, the connector which receives the conductors in a clutch type connection. As is known to those skilled in this technique, this type of connection constitutes a limitation to the current carrying capacity. In fact, the clutch type connection is carried out with goblet-shaped connectors, and the efficiency of such contacts cannot be ensured, since the coupling is to be manually effected, without any possibility of obtaining high contact pressures. An imperfect contact can even create an undesired overheating of the joint.

According to another method, the joint is carried out by means of sleeves provided with a longitudinal cavity or bore of such a diameter as to be able to slide on the cable core, and the space between the inner surface of said longitudinal cavity and, respectively, the core and the conductor is filled with small cylinders or adaptors, made of layers of material. It is known that the greater number of layers or elements of a joint, the greater the risk of air trapping. Moreover, the work of installation requires substantial time, and the cost of the joint is increased.

An improvement on the immediately preceding method includes a rigid housing which can be fitted on the sleeve and which is provided with means able to impart to the sleeve a longitudinal force capable of straightening it, so that it slides with the inner surface of its longitudinal cavity into contact with the outer surface of the small cylinders, expelling air. Said method, however, is not effective with respect to air which may be trapped between the small cylinders and the respective conductors, or between the small cylinder and the pressure connector. This fact is critical, since the connector is not screened, and this reduces to a large extent the voltage which may be applied to the joint, namely, the service voltage of the latter. Moreover, this assembly has the disadvantage of being provided with a sleeve having a longitudinal cavity of a diameter smaller than the diameter of the cable sheath. Therefore, there is the risk of scratching the inner surface of the longitudinal cavity of the sleeve during the insertion of the latter. Said surface usually is protected, during said operation, by a thick jacket of plastic material, which makes the method still more complicated.

The present invention provides an improved joint comprising an elastic sleeve for medium or high voltage cables insulated with extruded elastomeric or plastic material and which eliminates the hereinbefore-mentioned disadvantages and which ensures an economical joining. The resulting joint permits operation at the rated current carrying capacity and is constituted by a minimum number of elements which can be easily installed without any risk as to the integrity of the inner surface of the sleeve. The joint is provided with a screened clamp to prevent ionization phenomena in the most critical zone of the joint.

One object of the present invention is to provide an improved joint especially suitable for connecting conductors of the corresponding ends of single or multi-core cables insulated with an extruded elastomeric or plastic dielectric material, in which a dielectric, elastomeric sleeve surrounds a part of the semi-conductive outer screen, and the insulation of the cables and the joined ends. The inner diameter of said dielectric, elastomeric sleeve, before the assembling of the joint, is greater than the nominal diameter of the copper screen wound on the semiconductive outer element of each cable end, and the outer surface of said elastomeric sleeve fits within the inner surface of a metallic sleeve which is engaged at its ends with means able to tightly close said ends on the sheaths of said cable ends. Said means and said metallic sleeve are provided with elements for adjusting the axial compression on said dielectric, elastomeric sleeve to produce a transverse or radial expansion of the same intended to bring, in the assembling phase, the inner surface of said dielectric, elastomeric sleeve into contact with the outer surface of said part of the semi-conductive outer screen and with the outer surface of said insulation of the cable ends, so as to establish a condition of close adhesion between said surfaces in contact. The elastomeric sleeve has a semiconductive screen embedded therein with annular free ends extending at least to the inner surface of the elastomeric sleeve, and by reason of the compression of the elastomeric sleeve, said free ends are brought into contact with the semi-conductive outer screen of the cable ends. A semiconductive, hollow, cylindrical sleeve having appropriately shaped edges and pre-molded on the inner middle surface of said dielectric, elastomeric sleeve touches at least a contact element provided on the joined conductor ends.

The objects and advantages of the invention will be apparent to those skilled in the art from the following description of the presently preferred embodiments thereof, which description should be considered in conjunction with the accompanying drawings in which:

FIG. 1 is a side elevational view, partly in section, of the preferred embodiment of the joint of the invention;

FIG. 2 is a fragmentary, enlarged view, partly in section, of a modification of a portion of the embodiment shown in FIG. 1; and FIGS. 3 and 4 are fragmentary, enlarged sectional views of modifications of the screening element shown in FIG. 1.

The joint 10 illustrated in FIG. 1 connects the corresponding ends 11 and 12 of a pair of radial field cables provided with an extruded insulation, made, for example, of saturated chain ethylene-propylene copolymer or ethylenepropylene-diene terpolymer.

The cable ends 11 and 12 are deprived of preestablished lengths of the thermoplastic sheaths 13 and 14, respectively, so as to leave bare a part of screens constituted by lapped copper tapes 15 and 16. Each screen could also be formed by wires or in another known way.

Also, each screen is removed for a pre-established length in order to bare semi-conductive outer screens or semi-conductive coverings 17 and 18, partially removed in their turn to bare the corresponding insulation 19 and 20. Each insulation 19 and 20 is removed at its free end by cutting it away for a pre-established length together with a semi-conductive inner screen (not shown), covered by it, leaving bare the end portions of the conductors 21 and 22. The conductor 21 is connected to the conductor 22 by a pressure connector 23 or by means of any other appropriate connector. A contact element 24 surrounds the connector 23.

In the illustrated example, said contact 24 is constituted by at least an elastic element having good conductivity, and made, for example, of a rubber compound made semi-conductive by means of suitable fillers, which is arranged in direct conductive contact with the connector 23 (alternatively, the element 24 could be in direct conductive contact with only the conductors 21 and 22 connected to each other instead of with the connector 23) and by two rigid half-shells having a good conductivity, made, for example, of aluminum and preferably provided with centering means (not shown). Said half-shells are closed, one against the other, on the elastic element 24 in order to form a cylindrical body 26. The outer diameter of the latter is equal to or preferably slightly smaller than the inner diameter of a semi-conductive, hollow, cylindrical screen 27, having appropriately shaped, e.g., rounded, edges, in order to reduce the electric stress on the joint. Said cylindrical screen 27 is pre-molded on the inner surface of the cylindrical longitudinal cavity or bore 28 of the dielectric, elastomeric sleeve 29, which is made, for example, of saturated chain ethylene-propylene copolymer or ethylene-propylene-diene terpolymer, rubber, etc. The cylindrical body 26 acts as a support for the dielectric, elastomeric sleeve 29 at the screen portion 27. Said support need not be necessarily coincident with the contact element.

In an alternate embodiment illustrated in FIG. 2, the cylindrical body 26a is made of a rigid insulating material and has such a length that spaces are left between its own extremities and the insulation 19 and 20, respectively. Said spaces can be filled with elastic elements 25 of good conductivity, such as, for example, discs of semiconductive rubber applied around the conductors 21 and 22.

Conductive connection between the screen 27 and the conductors 21 and 22 can be carried out in many other appropriate ways. For example, the cylindrical body 26 could be omitted and an elastic element or elastic elements of good conductivity could directly contact the screen 27 and the connector 23, or conductors 21 and 22, conductively connecting them. The screen 27 can be made of the same material as the dielectric, elastomeric sleeve 29 but made semiconductive with the addition of appropriate fillers.

The cavity or bore 28 of the dielectric, elastomeric sleeve 29, before the assembling of the joint 10, has a diameter $0_{om}$ greater at least then the nominal outer diameter $0_{cu}$ of each screen 15 and 16, but, preferably, a diameter greater than the maximum diameter permissible for each screen 15, 16 by the processing tolerances.

The dielectric, elastomeric sleeve 29 which is preferably, but not necessarily, of cylindrical shape, and which is inserted on the cable ends 11 and 12, surrounds the conductors 21 and 22, the insulation 19 and 20 and substantially equal parts of the semi-conductive outer coverings 17 and 18 which, in this particular case, are formed by tapes.

A semi-conductive screen 30 is embedded for substantially its entire length in the dielectric, elastomeric sleeve 29 but has free annular ends 31 and 32 on the inner surface of the cavity or bore 28, which are engageable with the semi-conductive coverings 17 and 18, of the cable ends 11 and 12, respectively. The semi-conductive screen 30 creates an electric continuity between the semi-conductive outer covering 17 and the semi-conductive outer covering 18. In the example illustrated, the semi-conductive screen 30 is formed in a single piece and comprises a cylindrical intermediate portion 33 connected to end portions 34 and 35 of frusto-conical shape. Each of the latter is, in turn, connected at its smaller base to a free annular end 31 and 32, respectively. The semi-conductive screen 30 could also be obtained in any other appropriate manner. For example, the intermediate cylindrical portion 33 could be a piece separate from the terminal portions 34 and 35, could be in contact with said portions 34 and 35 as shown in FIG. 3, or separated therefrom, or could be spaced from the portions 34 and 35 and appear on the outer surface of said dielectric, elastomeric sleeve 29 as shown in FIG. 4. When the portion 33 is spaced from the portions 34 and 35, the length of the intermediate cylindrical portion 33 should exceed the distance between said terminal portions 34 and 35.

The dielectric, elastomeric sleeve 29 is enclosed in a metallic sleeve 36 having preferably, but not necessarily, a cylindrical shape and made of a good conductive material (e.g., aluminum), the inner diameter of which is equal to or greater than the outer diameter of the dielectric, elastomeric sleeve 29, so that the inner surface of the cylindrical tubular sleeve 36 may fit over the outer surface of the dielectric, elastomeric sleeve 29. The metallic cylindrical sleeve 36 engages at its ends with means 37 and 38 which are able to tightly close said ends on the sheaths 13 and 14 of the respective cable ends 11 and 12, and which exert an axial compression on the dielectric, elastomeric sleeve 29.

The metallic cylindrical sleeve 36 is also provided, at both of its ends, with flanges 39 and 40 which, by means of appropriate adjusting elements, e.g., two pluralities of bolts and nuts 39a and 40a, each directed along axes a-a and b-b, respectively, draw the flanges toward each other. The bolt 39a extends through holes 41 and 43 of the flanges 39 and 45, and the bolt 40a extends through holes 42 and 44 of flanges 40 and 46; and the remainder of the plurality of bolts and nuts 39a and 40a similarly extend through holes in such flanges spaced circumferentially thereof.

Said means 37 and 38 comprise first and second tubular portions, respectively, which are symmetrically arranged with respect to said metallic cylindrical sleeve 36. The flanges 45 and 46 divide the tubular portions of the means 37 and 38, respectively, into first and second parts. The first parts 47 and 48, nearer the dielectric, elastomeric sleeve 29, can fit within said metallic cylindrical sleeve 36 to close its ends. The parts 47 and 48 also apply pressure, by way of the disc-shaped ends 49 and 50 thereof, on the bases of the dielectric, elastomeric sleeve 29, through annular sealing elements 51 and 52 (e.g., O-rings) and rings of rigid material 53 and 54.

The second, or opposite, parts 55 and 56, one belonging to the means 37 and the other to the means 38, are provided with inner threads mating with threads on ring nuts 57 and 58, which compress sealing rings 59 and 60 between two pairs of rings 61 and 62 and 63 and 64 of plastic material, which are loose with respect to said sheaths 13 and 14. The inner abutments 65 and 66 of the means 37 and 38, respectively, engage 62 and 63, and the combination provides a stuffing-box type of closure for each end of the joint 10. Thus, the assembly formed by the means 37 and the ring nut 57, and the assembly formed by the means 38 and the ring nut 58, constitute means for tightly closing the ends of the metallic cylindrical sleeve 36 on the sheaths 13 and 14, respectively.

Electrical continuity between the copper screens 15 and 16 can be obtained with a direct connection (not shown) of each screen 15 and 16 to an element of the corresponding assembly formed by the means 37 or 38 and the ring nut 57 or 58, and, through it, to the metallic sleeve 36, or by connecting the copper screen 15 to the means 37 and the latter, through an appropriate external means, for example, a conductive strand, to the means 38 connected in its turn to the copper screen 16.

The assembling of the joint 10 is effected by first inserting the assembly formed by the tubular element 37 and the ring nut 57 with the relative packing glands, the sealing ring 51 and the rigid ring 53, on the sheath 13 of the cable end 11. Such end 11 has been previously prepared by removing pre-established portions of said sheath 13, the copper screen 15, the semi-conductive outer screen 17, and the insulation 19. Similarly, on the sheath 14 of the cable end 12 previously prepared, is inserted the assembly formed by the tubular element 38 and the ring nut 58 with the relative packing glands, the sealing ring 52 and the rigid ring 54. Then, the assembly formed by the metallic cylindrical sleeve 36 and the dielectric, elastomeric sleeve 29 is inserted on one of the two cable ends, for example, on the end 11.

The two units of the assembly can be mounted separately, namely, at first the metallic cylindrical sleeve 36 and then the dielectric, elastomeric sleeve 29, or they can be mounted already joined with each other. However, the first solution is preferably in view of an easier assembling operation and of a more reliable centering of the dielectric, elastomeric sleeve 29 on the joint.

Obviously, the dielectric, elastomeric sleeve 29, inserted on the cable end 11, must be so displaced as to leave access to the conductor 21. During the displacement of the sleeve 29, it will slide on the insulation 19, the semi-conductive covering 17 and the copper screen 15 without the risk of damaging said covering 17 or said screen 15. This results because of the diameter $\phi_{om}$ of the longitudinal cavity or bore 28, which is greater than the diameter $\phi_{cu}$ of the copper screen 15.

Generally, the length of the sleeve 29 is such as not to exceed the sum of the bare portions of insulation 19, covering 17 and copper screen 15. However, if this is not the case, it is possible either to use a sleeve 29 in which the diameter $\phi_{om}$ of the longitudinal cavity or bore 28 is greater than the diameter of the sheath 13, or to remove a portion of the latter, which will then be restored by means of a dielectric made of lapped tapes or by means of a sleeve of heat-shrinkable, plastic material. In the latter case, the plastic sleeve should be inserted on the sheath 13 before applying the rigid ring 53. At this point in the assembly of the joint, the conductors 21 and 22 are connected by means of the pressure connector 23, which is compressed onto them. The contact element 24 is then arranged about the connector 23.

The next step consists of moving the dielectric, elastomeric sleeve 29 in order to center it with respect to the connection of the conductors 21 and 22, so that the screen 27 may surround the contact element 24 and a part of the insulation 19 and 20 to screen the latter at the cut.

Then, the metallic cylindrical sleeve 36 is inserted on the dielectric, elastomeric sleeve 29 in such a way as to center it with respect to the connection of the conductors 21 and 22. Subsequently, the elements 37 and 38 are slid towards the assembly formed by the dielectric, elastomeric sleeve 29 and the metallic cylindrical sleeve 36. Said elements penetrate into the metallic cylindrical sleeve 36 until their disc-shaped bases 49 and 50 press the sealing rings 51 and 52 and the rigid rings 53 and 54 against the ends of the sleeve 29.

At this point, the flange 39 of the metallic cylindrical sleeve 36 is drawn toward the corresponding flange 45 of the element 37 by means of the bolts 39a described hereinbefore, each of which is tightened by means of the nut thereon. Similarly, the metal flange 40 of the metallic cylindrical sleeve 36 is drawn toward the corresponding flange 46 of the element 38 by means of the corresponding bolts 40a, each of which is tightened by means of the nut thereon.

The bolts 39a and 40a act as means for adjusting the axial compression of the parts between the elements 37 and 38. In fact, the turning of each nut on its bolt is adjusted, for flanges 39 and 45 and 40 and 46, in such a way that the two parts 47 and 48 of the elements 37 and 38, respectively, are advanced symmetrically into the sleeve 36 and exert an axial compression in a transverse or radial direction thereby pressing against the insulation 19 and 20 of the cable ends 11 and 12, in the manner of a hoop, which expels the air existing between the inner surface of the longitudinal bore 28 and the outer surfaces of the insulation 19 and 20 as well as the semi-conductive outer coverings 17 and 18. The air escapes laterally from the interstices existing between the rigid rings 53 and 54 and the semiconductive coverings 17 and 18, respectively.

However, the deformation of the dielectric, elastomeric sleeve 29 is limited only to the parts of the latter which surround the insulation 19 and 20 and portions of the semi-conductive coverings 17 and 18, because the central part of said dielectric, elastomeric sleeve 29 bears against the support constituted by the cylindrical body 26 and the contact element 24.

Laboratory tests have demonstrated that, by means of an appropriate compression, a perfect mechanical adhesion is obtained between the sleeve 29 and the insulation 19 and 20. The adhesion is such that sometimes, if the materials constituting the sleeve 29 and the insulation 19 and 20 are chemically analogous rubbers, a bond is obtained between the inner surface of the longitudinal bore 28 and the outer surface of the insulation 19 and 20.

Finally, the ring nuts 57 and 58 are tightened in their respective seats 55 and 56 so as to engage the sealing rings 59 and 60 with the respective sheaths 13 and 14 and to prevent the passage of moisture along said sheaths towards the joint.

It will be understood by those skilled in the art that various modifications of the invention may be made without departing from the principles of the invention.

What is claimed is:

1. An electric cable joint interconnecting a pair of cables, each cable comprising a conductor surrounded by insulation which in turn is surrounded by a conductive screening layer, said screening layer being surrounded by at least one further layer of material, a portion of said insulation being removed to expose an end portion of the conductor, a portion of said screening layer removed to expose an end portion of said insulating layer, and a portion of said further layer being removed to expose an end portion of said screening layer, means conductively interconnecting the end portion of the conductor of one said cable to and in longitudinal alignment with the end portion of the conductor of the other said cable, an elastomeric sleeve of insulating material having a normal internal bore at least equal in size to the size of said screening layer and disposed around the interconnected conductor end portions, the end portions of the insulation of each cable and at least part of the end portions of the screening layer of each cable and extending from the screening layer end portion of one said cable to the screening layer end portion of the other said cable, said sleeve having an outer conductive screen comprising a central portion spaced from the bore of said sleeve and extending around said conductor end portions and a pair of end portions at opposite sides of said central portion embedded in said sleeve and extending around and in conductive contact with at least part of the screening layer, one end portion contacting the screening layer of one said cable and the other end portion contacting the screening layer of the other said cable, said sleeve also comprising an inner conductive screen at the wall of its bore extending around said conductor end portions and from the insulation at one side thereof to the insulation at the opposite side thereof, conductive means conductively interconnecting said inner screen and said conductor end portions, a metal sleeve surrounding said elastomeric sleeve, and compression means acting between said metal sleeve and the ends of said elastomeric sleeve and compressing the latter longitudinally thereof and thereby causing said elastomeric sleeve to expand transversely of its length and press the wall of said bore against said insulation end portions.

2. An electric cable joint as set forth in claim 1, wherein said further layer comprises a winding of copper tape and wherein said bore of said elastomeric sleeve is cylindrical and has a diameter greater than the maximum permissible diameter of said winding.

3. An electric cable joint as set forth in claim 1, wherein the outer surface of said elastomeric sleeve and the inner surface of said metal sleeve are cylindrical and wherein the diameter of the inner surface of said metal sleeve is at least equal to the diameter of the outer surface of said elastomeric sleeve.

4. An electric cable joint as set forth in claim 1, wherein said elastomeric sleeve is made from a material selected from the group consisting of saturated chain ethylene propylene copolymer and saturated chain ethylene-propylenediene terpolymer.

5. An electric cable joint as set forth in claim 1, wherein said screening layer, said outer screen and said inner screen are made of semi-conductive material.

6. An electric cable joint as set forth in claim 1, wherein the inner surface of said elastomeric sleeve is cylindrical and said outer screen is unitary and is embedded in said elastomeric sleeve and wherein said central portion of said outer screen is cylindrical and said end portions are frusto-conical with their smaller ends facing away from said central portion and terminating in annular portions having inner surfaces at said inner surface of said elastomeric sleeve.

7. An electric cable joint as set forth in claim 1, wherein the inner surface of said elastomeric sleeve is cylindrical, said central portion of said outer screen is cylindrical and is on the outer surface of said elastomeric sleeve and is separate from said end portions but has a length greater than the distance between the ends of said end portions nearer each other and wherein said end portions are embedded in said elastomeric sleeve and are frusto-conical with their smaller ends facing away from each other and extending to said inner surface of said elastomeric sleeve.

8. An electric cable joint as set forth in claim 1, wherein said metal sleeve comprises a pair of flanges, one at each end thereof and said compression means comprises a pair of tubular elements, one at each end of said metal sleeve and surrounding the cable at said end, each of said elements being slidable into said metal sleeve and having an internal size at least equal to the external size of the cable which it surrounds and each having an outwardly extending flange and adjustable pressure means interconnecting the flange on one tubular element with the flange on said metal sleeve adjacent thereto and interconnecting the flange on the other of said tubular element with the flange on said metal sleeve adjacent thereto whereby said tubular elements may be pressed toward said elastomeric sleeve.

9. An electric cable joint as set forth in claim 8, wherein said adjustable pressure means are threaded bolts and nuts extending between the flanges on said tubular elements and the flanges on said metal sleeve, said bolts passing through apertures in said flanges.

10. An electric cable joint as set forth in claim 8, wherein each tubular element has an inwardly extending portion at the end thereof nearer said elastomeric sleeve and further comprising an annular element intermediate said elastomeric sleeve and each of said inwardly extending portions.

11. An electric cable joint as set forth in claim 10, wherein each tubular element has a threaded portion at the end thereof opposite from said metal sleeve and each cable comprises a sheath and further comprising a pair of threaded ring nuts extending around the sheaths of said cables with one thereof engaging the threaded portion of one of said elements and with the other thereof engaging the threaded portion of the other of said elements and at least one sealing ring between each of said ring nuts and the tubular element which it engages and engaging the cable sheath.

12. An electric cable joint as set forth in claim 1, wherein said inner screen is made of semi-conductive material and is cylindrical and wherein said conductive means comprises a conductive, hollow, rigid, cylindrical body having an exterior diameter slightly less than the inner diameter of said inner screen disposed within said inner screen, said body having two semi-cylindrical mating parts, and an elastic element of relatively low conductivity intermediate said body and the connected conductor end portions.

* * * * *